(12) United States Patent
Johnsson et al.

(10) Patent No.: US 10,877,865 B2
(45) Date of Patent: Dec. 29, 2020

(54) COMPUTE INFRASTRUCTURE RESOURCE MONITORING METHOD AND ENTITIES

(71) Applicant: Telefonaktiebolaget LM Ericsson (publ), Stockholm (SE)

(72) Inventors: Andreas Johnsson, Uppsala (SE); Christofer Flinta, Stockholm (SE); Johan Christer Wilhelm Granath, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 481 days.

(21) Appl. No.: 15/566,616

(22) PCT Filed: Apr. 27, 2015

(86) PCT No.: PCT/EP2015/059080
§ 371 (c)(1),
(2) Date: Oct. 13, 2017

(87) PCT Pub. No.: WO2016/173615
PCT Pub. Date: Nov. 3, 2016

(65) Prior Publication Data
US 2018/0107577 A1    Apr. 19, 2018

(51) Int. Cl.
H04L 12/26 (2006.01)
G06F 11/34 (2006.01)
G06F 11/30 (2006.01)

(52) U.S. Cl.
CPC ...... *G06F 11/3428* (2013.01); *G06F 11/3495* (2013.01); *H04L 43/0817* (2013.01);
(Continued)

(58) Field of Classification Search
None
See application file for complete search history.

(56) References Cited

U.S. PATENT DOCUMENTS 10,219,155 B2 * 2/2019 Anderson ........... H04L 63/1425
2012/0304175 A1    11/2012 Damola et al.
(Continued)

FOREIGN PATENT DOCUMENTS

WO    2013027332 A1    2/2013

OTHER PUBLICATIONS

International Search Report and Written Opinion for Application No. PCT/EP2015/059080, dated Jan. 27, 2016, 14 pages.
(Continued)

*Primary Examiner* — Cai Y Chen
(74) *Attorney, Agent, or Firm* — Patent Portfolio Builders, PLLC

(57) ABSTRACT

A compute infrastructure interconnected with a network configured for allotting a benchmark message. The benchmark message comprises program code, or references to program code, to be executed on a reflecting entity. The reflecting entity is able to execute program code. The program code requests capabilities of the reflecting entity when being executed. The compute infrastructure is further configured for sending of the benchmark message to the reflecting entity. The compute infrastructure is further configured for receiving the benchmark message and for executing, in the reflecting entity, the program code. The compute infrastructure is further configured for providing a benchmark reply message. The benchmark reply message comprises execution time and optionally execution result of the execution of said program code. The compute infrastructure is further configured for returning the benchmark reply message from the reflecting entity.

23 Claims, 11 Drawing Sheets

(52) U.S. Cl.
CPC ........ *H04L 43/106* (2013.01); *G06F 11/3006* (2013.01); *G06F 11/3093* (2013.01); *G06F 11/3419* (2013.01); *G06F 11/3433* (2013.01); *G06F 2201/815* (2013.01); *G06F 2201/835* (2013.01); *G06F 2201/875* (2013.01)

(56) References Cited

U.S. PATENT DOCUMENTS

| | | | |
|---|---|---|---|
| 2012/0324079 A1 | 12/2012 | Quinet et al. | |
| 2013/0304175 A1* | 11/2013 | Voegele | A61N 1/0476 607/149 |
| 2014/0181814 A1* | 6/2014 | Lee | G06F 9/45558 718/1 |
| 2016/0119214 A1* | 4/2016 | Luo | H04L 43/106 370/253 |
| 2017/0262217 A1* | 9/2017 | Pradhan | G06F 3/0605 |
| 2017/0353467 A1* | 12/2017 | Anderson | H04L 63/1425 |

OTHER PUBLICATIONS

International Preliminary Report on Patentability for Application No. PCT/EP2015/059080, dated May 31, 2017, 20 pages.

K. Hedayat et al., "A Two-Way Active Measurement Protocol (TWAMP)," Oct. 2008, 26 pages, Network Working Group, RFC 5357, the IETF Trust.

M. Chiba et al., "Cisco Service-Level Assurance Protocol," Jan. 2013, 20 pages, Independent Submission, RFC 6812, the IETF Trust and the persons identified as the document authors.

J. Postel, "Internet Control Message Protocol, DARPA Internet Program Protocol Specification," Sep. 1981, Network Working Group, RFC 792.

"Iperf—Wikipedia, the free encyclopedia," 3 pages, downloaded from https://en.wikipedia.org/wiki/Iperf on Aug. 17, 2015.

S. Shalunov et al., "A One-Way Active Measurement Protocol (OWAMP)," Sep. 2006, 56 pages, Network Working Group, RFC 4656, The Internet Society.

"Amazon CloudWatch, Developer Guide, API Version Aug. 1, 2010," 236 pages, Amazon Web Services, Inc. and/or its affiliates.

"VCenter Hyperic Resource Configuration and Metrics, vCenter Hyperic 5.8," 2014, 730 pages, VMware, Inc.

"Welcome to the Ceilometer developer documentation!," downloaded from http://docs.openstack.org/developer/ceilometer/ on Aug. 17, 2015, 2 pages.

Office Action issued in corresponding EP application No. 15722667.1 dated Sep. 14, 2018, 05 pages. The references therein have been previously made of record.

* cited by examiner

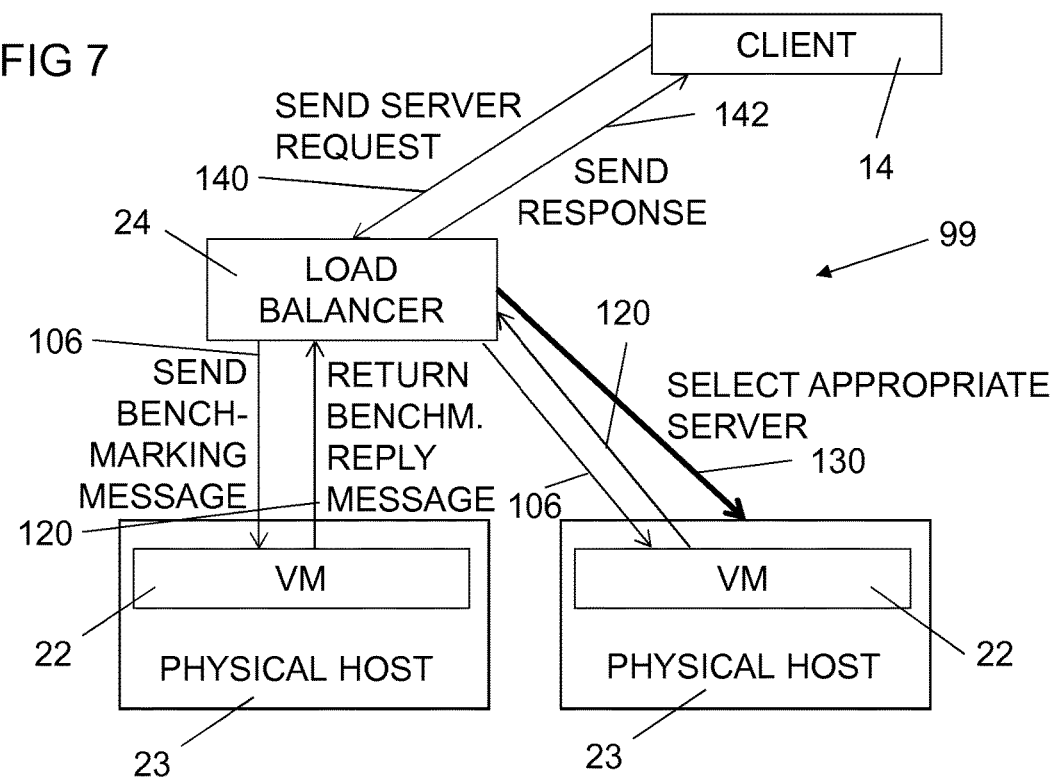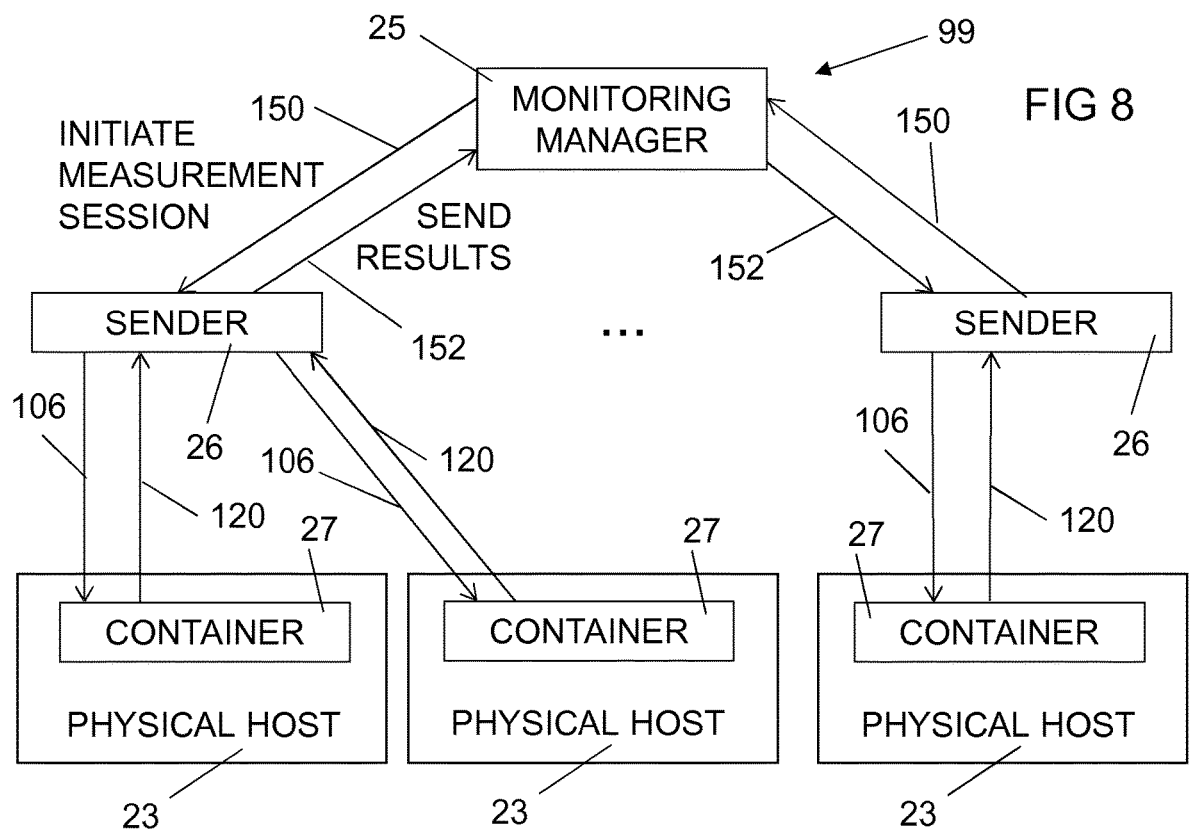

COMPUTE INFRASTRUCTURE RESOURCE MONITORING METHOD AND ENTITIES

CROSS-REFERENCE TO RELATED APPLICATIONS

This application is a National stage of International Application No. PCT/EP2015/059080, filed Apr. 27, 2015, which is hereby incorporated by reference.

TECHNICAL FIELD

The proposed technology generally relates to communication and processing in a compute infrastructure interconnected with a network, and in particular to methods, arrangements, computer programs and computer program products monitoring compute infrastructure.

BACKGROUND

The cloud computing paradigm has become a cornerstone for networks and services in which computing, networking and storage resources are hosted in interconnected and federated datacentres. The infrastructure is made available on demand to users and their applications. Cloud computing and cloud networking can be considered as the logical evolution of the grid computing concept with a critical differentiating factor; usage patterns and hardware investments does not need to be planned ahead. A cloud user simply requests the resources through a cloud resource provider for the specific timeframe and is then charged for that time period.

Cloud infrastructure providers offer the core infrastructure while cloud service providers mostly lease these resources to deliver services to end users. The main advantages for users of the cloud are lower operating expenditures (OPEX), lower capital expenditures (CAPEX), scalability, elasticity and ease of use.

The cloud model can be divided into four layers; the hardware layer (1), the infrastructure layer (2), the platform layer or virtualization layer (3) and the application layer (4). Each higher layer builds on top of the features and services provided by the lower layers. These layers pertain well to describe the different business models built on the cloud paradigm.

The hardware layer typically refers to the datacentre and associated core infrastructure.

The infrastructure is offered as infrastructure-as-a-service (IaaS) at layer 2. Technologies and vendors operating at this layer include Amazon (e.g. Amazon Elastic Cloud EC2), OpenStack, GoGrid and Flexiscale.

Then, at layer 3, the platform layer, vendors are providing high-level platforms and environments to develop software or services often referred to as platform-as-a-service (PaaS). These platforms are usually in the form of operating systems and/or software frameworks. The point is to shield the user from dealing with the underlying complexities of the infrastructure entities such as Virtual Machine (VM) containers and raw storage blocks. Examples include Microsoft Azure and Google AppEngine.

At the application layer there are different service providers providing business applications, web services, multimedia and gaming services. Examples are Google Apps, Facebook, Dropbox. All of these qualify as software-as-a-service (SaaS) in the cloud paradigm terminology.

The cloud can also be categorized into the private, public or hybrid cloud.

Private clouds are built specifically for the organization to provide control over the security and different performance related aspects. However the obvious drawback is in terms of high upfront cost.

The public cloud aims at delivering IaaS, PaaS or SaaS to the general public. In this case there are no upfront capital costs. But it does not provide the granular control over the security and different performance and infrastructure level parameters. One specific version of public clouds is the virtual private cloud. This concept relies on running the organizations cloud infrastructure on top of public cloud. In this case Virtual Private Network (VPN) technology is used to virtualize the network infrastructure essentially providing the organization the flexibility to provide its own network security and topology settings.

Hybrid clouds try to address some of the limitations of the above mentioned cloud types. Specifically, much of the critical business control and services run in the private cloud while still offering the flexibility to delegate the less critical business services on the public clouds. It also provides the opportunity to expand the service capacity in peek durations using the public cloud offerings. But it requires careful analysis of the splitting the business services that should be run on public cloud based on the security, privacy, flexibility, availability and performance requirements.

Yet another type of cloud is the telecommunication cloud, or Telco cloud for short, in which companies in the telecommunication industry offers value to customers and operators not currently addressed.

Traditional telecommunication services such as the mobile base station, the mobile core and the Internet protocol Multimedia System (IMS) will run as virtualized services on top of the Telco cloud. This concept is often referred to as network function virtualization (NFV) and is being defined in standard groups such as ETSI GS NFV. The group has defined and described use cases for various telecommunication functions, how to virtualize the functions and how they can coexist with the non-virtualized world.

Other types of services can also be envisioned, such as industry and factory applications with high performance demands and end-user applications such as collaborative and self-driving cars to be executed on the Telco cloud. Thus, the Telco cloud must support mission critical activities such as remote control of factories and robots as well as doctor exams and possibly remote surgery. Some application types may connect directly to the datacentres via the Internet while other connects through the radio access networks.

The main differences between standard cloud and Telco cloud can be summarized in higher demands on Service Level Agreements (SLAs) related to reliability and performance, a more diverse execution environment and regulatory requirements.

Due to the high requirements in the Telco cloud environment it is critical to develop techniques for service assurance to fulfil the SLA requirements, but also other requirements. This involves continuous monitoring of the relevant Key Performance Indicators (KPIs) relating to the specific SLA for the service, analysing the data for finding abnormal trends and anomalies and triggering the suitable cloud orchestration actions in case of any violations.

Monitoring of the cloud infrastructure is about understanding the current status of the infrastructure as well as the applications running on top. The metrics of interest are usually divided into four different categories; compute, memory, network and storage. Each category can relate to metrics either obtained at the hypervisor or VM level.

In the following we exemplify metrics in each individual category. Note that each metric can either be measured for the whole system, for the hypervisor or for each individual VM executing in the system.

The compute metrics are mainly related to the Central Processing Unit (CPU) or Graphics Processing Unit (GPU) of the system. Specific metrics include:
Total CPU utilization
CPU utilization for user level processes
CPU utilization for system level processes
CPU waiting time for Input/Output (I/O) operations to finish
Affinity per CPU and core
Examples of memory metrics include:
Total installed memory in system
Free memory
Total swap memory
Free swap memory
Memory utilization
For network related metrics, metrics that can be measured within a hypervisor or VM are exemplified. The metrics, which can be measured at a physical or a virtual interface, include:
Total number of packets transmitted
Total number of packets received
Total number of bytes transmitted
Total number of bytes received
Available capacity
The storage metric category includes metrics such as:
Available disk space
Storage I/O operations per time unit
Number of disk reads per time units
Number of disk writes per time units
Disk idle time Monitoring of resources, both virtualized and physical, in cloud computing environments is a relatively mature research area, with production-grade environments operating in large public and private clouds for several years. Amazon CloudWatch and VMware vCenter Hyperic are representative toolsets for the public and private cloud monitoring, respectively.

CloudWatch monitors resources at Amazon, currently the largest provider of public cloud infrastructure. CloudWatch is made available in an as-a-service manner. It includes a large number of pre-defined metrics at both application and infrastructure level. The users have a limited capability to define their own metrics, and billing depends on the frequency of the monitoring interval.

Hyperic is part of the VMware cloud management suite. It provides performance monitoring for physical and virtual infrastructure, middleware and several enterprise applications using a combination of agentless and classical agent-based monitoring. Significant capabilities are the auto-discovery of key properties for newly-created VMs and automatic configuration of monitoring functionality. Hyperic also has the capability to copy and re-use monitoring configurations and alert policies, speeding up the deployment of monitoring capabilities. Hyperic is part of the vCenter Operations Enterprise framework, which allows determining dynamic thresholds based on hourly-observed behaviour of a performance metric in correlation with other metrics.

The Openstack Telemetry component, also known as Ceilometer, implements infrastructure level monitoring in cloud environments based on the OpenStack platform. It collects monitoring information from compute, network and storage resources in Openstack-managed environments. It expects the resource managers to publish monitoring information through the Oslo messaging bus, but push and pull agents that communicate directly with the resource managers are also supported. Ceilometer has no capabilities of monitoring virtual network functions, which are regarded as applications from its perspective. Ceilometer offers a REST API to access monitoring information once it was stored in the database. Ceilometer is integrated with Heat, the orchestration component of Openstack, and provides input data for performance-triggered auto-scaling rules.

Processes of current monitoring system for virtual machine utilization and free capacity in the computing node are thus performed by analysing statistics based on monitoring of metrics such as CPU utilization, free memory and memory consumption. These metrics provide a guideline to how much more processing the machine can allow without violating the current, typical SLAs towards existing tasks.

This information is, at least in certain applications, not enough to make a statement on whether it is possible to execute another task on the machine. The current task may for example be very I/O intensive with high CPU peaks but low average CPU utilization. Just looking at the averages of CPU utilization of the task and the available CPU on the host one might draw the conclusion that the task can be executed on the machine. When started it can turn out that the peaks cannot be fulfilled and hence the SLA of the new (or old) task is violated.

Existing solutions of monitoring of the cloud infrastructure therefore do not provide any efficient method for performing generalized tests of various performance and capacity issues related to VMs and containers from a centralized location.

SUMMARY

It is an objective to provide improved methods and arrangements for monitoring of cloud infrastructure. This and other objectives are met by embodiments of the proposed technology. In general terms, according to a first aspect, there is provided a method for resource monitoring of a compute infrastructure interconnected with a network. The method comprises the steps of allotting a benchmark message and initiating sending of the benchmark message to a reflecting entity. The benchmark message comprises program code, or references to program code, to be executed on the reflecting entity, which reflecting entity is intended to be monitored. The reflecting entity is able to execute program code. The program code of the allotted benchmark message requests capabilities of the reflecting entity when being executed.

In a second aspect, there is provided a method for assisting in resource monitoring of a compute infrastructure interconnected with a network. The method comprises the step of receiving of a benchmark message, in a reflecting entity that is able to execute program code. The benchmark message comprises program code or references to program code. The program code of the benchmark message requests capabilities of the reflecting entity when being executed. The method comprises the further steps of executing the program code of the benchmark message, and providing a benchmark reply message. The benchmark reply message comprises execution time and optionally execution result of the execution of the program code. The method comprises the further step of returning the benchmark reply message.

In a third aspect, there is provided a monitoring initiating entity in a compute infrastructure interconnected with a network. The monitoring initiating entity is configured for allotting a benchmark message and for initiating sending of the benchmark message to a reflecting entity. The benchmark message comprises program code, or references to program code, to be executed on the reflecting entity, which reflecting entity is intended to be monitored. The reflecting entity is able to execute program code. The program code of the allotted benchmark message requests capabilities of the reflecting entity when being executed.

In a fourth aspect, there is provided a reflecting entity in a compute infrastructure interconnected with a network. The reflecting entity is able to execute program code. The reflecting entity is configured for receiving a benchmark message. The benchmark message comprises program code or references to program code. The program code of the benchmark message requests capabilities of the reflecting entity when being executed. The reflecting entity is further configured for executing the program code of the benchmark message and for providing a benchmark reply message. The benchmark reply message comprises execution time and optionally execution result of the execution of the program code. The reflecting entity is further configured for returning the benchmark reply message.

In a fifth aspect, there is provided a compute infrastructure interconnected with a network configured for allotting, in a monitoring initiating entity, a benchmark message. The benchmark message comprises program code, or references to program code, to be executed on a reflecting entity, which reflecting entity is the particular reflecting entity intended to be monitored. The reflecting entity is able to execute program code. The program code of the allotted benchmark message requests capabilities of the reflecting entity when being executed. The compute infrastructure is further configured for sending of the benchmark message to the reflecting entity. The compute infrastructure is further configured for receiving, in the reflecting entity, the benchmark message and for executing, in the reflecting entity, the program code of the benchmark message. The compute infrastructure is further configured for providing, in the reflecting entity, a benchmark reply message. The benchmark reply message comprises execution time and optionally execution result of the execution of said program code. The compute infrastructure is further configured for returning the benchmark reply message from the reflecting entity.

In a sixth aspect, there is provided a computer program comprising instructions, which when executed by at least one processor, cause the processor(s) to allot a benchmark message and to initiate sending of the benchmark message to a reflecting entity. The benchmark message comprises program code, or references to program code, to be executed on the reflecting entity, which reflecting entity is intended to be monitored. The reflecting entity is able to execute program code. The program code of the allotted benchmark message requests capabilities of the reflecting entity when being executed.

In a seventh aspect, there is provided a computer program comprising instructions, which when executed by at least one processor, cause the processor(s) to receive a benchmark message. The benchmark message comprises program code or references to program code. The program code of the benchmark message requests capabilities when being executed. The computer program comprises further instructions, which when executed by the processor(s), cause the processor(s) to execute the program code of the benchmark message and to provide a benchmark reply message. The benchmark reply message comprises execution time and optionally execution result of the execution of the program code. The computer program comprises further instructions, which when executed by the processor(s), cause the processor(s) to return the benchmark reply message.

In an eighth aspect, there is provided a carrier that comprises the computer program of the sixth or seventh aspect. The carrier is one of an electronic signal, an optical signal, an electromagnetic signal, a magnetic signal, an electric signal, a radio signal, a microwave signal, or a computer-readable storage medium.

In a ninth aspect, there is provided an arrangement in a compute infrastructure interconnected with a network. The arrangement comprises an allotting module for allotting a benchmark message and an initiating module for initiating sending of the benchmark message to a reflecting entity. The benchmark message comprises program code, or references to program code, to be executed on the reflecting entity that is able to execute program code. The reflecting entity is intended to be monitored. The program code of the allotted benchmark message requests capabilities of the reflecting entity when being executed.

In a tenth aspect, there is provided a reflecting arrangement in a compute infrastructure interconnected with a network. The reflecting arrangement comprises a receiver for receiving a benchmark message. The benchmark message comprises program code or references to program code. The program code of the benchmark message requests capabilities when being executed. The reflecting arrangement further comprises an executing module for executing the program code of the benchmark message and a providing module for providing a benchmark reply message comprising execution time and optionally execution result of the execution of the program code. The reflecting arrangement further comprises a returning module for returning the benchmark reply message.

An advantage of the proposed technology is that it allows for active and on-demand evaluation of e.g. a virtual machine/container performance. It provides an effective and efficient method for performing generalized tests of various performance and capacity issues related to virtual machines and containers, as well as other virtual resources like storage, from a centralized location.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 7 is a schematic illustration of an embodiment of a load balancer of a data centre;

FIG. 8 is a schematic illustration of an embodiment of a monitoring manager of a cloud operator;

DETAILED DESCRIPTION

Figure 1:
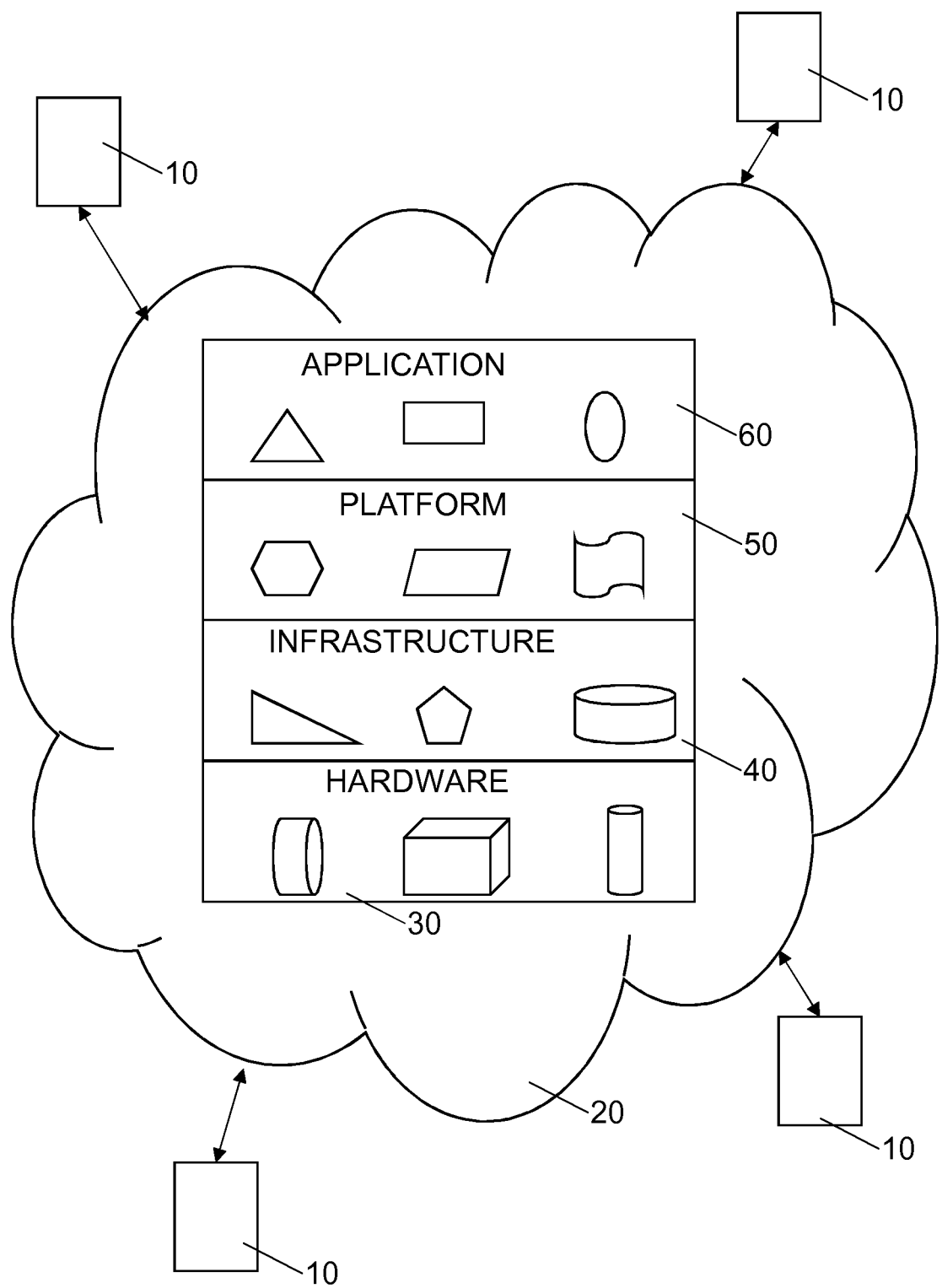
FIG. 1 is a schematic illustration of cloud computing.

Throughout the drawings, the same reference designations are used for similar or corresponding elements.

For a better understanding of the proposed technology, it may be useful to begin with a brief overview of active measurements in packet-switched networks. Active measurements has long been an accepted method for determining communication performance parameters of packet-switched networks. The basic concept is to transmit probe packets from a sender towards a receiver. Each probe packet is time stamped on both sides.

The Measurement EndPoint (MEP) and measurement Intermediate Point (MIP) functionality and capabilities depend on the network technology deployed. For an Internet Protocol (IP) network the MEP functionality is probably based on IETF Two-Way Active Measurement Protocol (TWAMP), IETF Ericsson Two-Way Active Measurement Protocol (TWAMP) Value-Added Octets, IETF Internet Control Message Protocol (ICMP) or the proprietary Cisco Service Level Agreement (SLA) protocol.

The above technologies are capable of measuring performance metrics such as one-way delay, round-trip time, loss, delay (jitter), throughput and available capacity.

In IP networks many operators often rely on Iperf. Iperf is a commonly used network testing tool that can create Transmission Control Protocol (TCP) and User Datagram Protocol (UDP) data streams and measure the throughput of a network that is carrying them. It also reports on jitter, round-trip times and loss. The tool is a de-facto standard among network operators.

The IETF IP Performance Metrics (IPPM) working group has defined two IP active measurement protocols: One-Way Active Measurement Protocol (OWAMP) and Two-Way Active Measurement Protocol (TWAMP). OWAMP is designed for measuring one-way packet delay and one-way packet loss between two hosts. TWAMP is based on OWAMP. TWAMP is designed for measuring one-way and two-way (round-trip) packet delay and packet loss between two hosts.

The standard TWAMP consists of two protocols: the TWAMP control protocol and the TWAMP test protocol. The TWAMP control protocol is used to initiate, start and stop TWAMP test sessions. The TWAMP test protocol is used to exchange TWAMP test packets between two TWAMP hosts or endpoints. Test sessions can also be configured without the TWAMP control protocol and this is known as TWAMP light.

The standard TWAMP measurement architecture is usually comprised of only two types of hosts with specific roles. This is known as the two-host implementation. One host plays the role as the control-client and session-sender and the other host plays the role as the server and the session-reflector. The host that initiates the TWAMP control TCP connection takes the roles of the control-client and session-sender. The host that acknowledges the TWAMP control TCP connection accepts the roles of the server and session-reflector. In real-life network deployment, each host may participate in several active sessions at the same time, both as control-client/session-sender and server/session-reflector.

In a TWAMP test session, packets are time stamped, tagged with sequence numbers and transmitted from a session-sender to a session-reflector. The session-reflector time stamps the incoming packets, creates new test packets (one packet is created for each test packet received by the session-reflector) and sends them to the session-sender as soon as possible. Using these time stamps and sequence numbers, the session-sender can then calculate the one-way delay, jitter and packet loss for the session in both the forward path and the reverse path.

OWAMP and TWAMP are very useful in monitoring communication performance parameters within a network. However, OWAMP and TWAMP cannot be used, as such, for measuring the responsiveness of e.g. a virtual or physical machine residing in a cloud infrastructure for the purpose of providing a more accurate view on VM performance.

Current resource monitoring system for virtual machine utilization and free capacity in the computing node is done by analysing statistics based on passive monitoring of metrics such as CPU utilization, free memory and memory consumption. These metrics provide a guideline to how much more processing the machine can allow without violating the SLAs towards existing tasks.

In a cloud infrastructure or generally in a compute infrastructure interconnected with a network, virtual machine utilization and free capacity in the computing node may be of equal importance as communication performance. Resource monitoring thus has to be provided differently.

When the requirements on efficient utilization increase, it is believed that this information is not enough to make a statement on whether it is possible to execute another task on the machine. The current task may for example be very I/O intensive with high CPU peaks but low average CPU utilization. Just looking at the averages of CPU utilization of the task and the available CPU on the host one might draw the conclusion that the task can be executed on the machine. When started it can turn out that the peaks cannot be fulfilled and hence the SLA of the new (or old) task is violated.

To overcome this problem, the proposed technology describes a method for actively measure the responsiveness concerning executing on a certain priority level of a virtual or physical machine residing in a cloud infrastructure, or more general a compute infrastructure interconnected with a network, for the purpose of providing a more accurate view on VM, physical machine or container performance, which in turn enable a more efficient utilization of resources. This gives a better monitoring than just extracting counters and averages from tools such as ceilometer. An average of CPU utilization or unused memory does not necessarily predict how a specific application would behave in the machine. The responsiveness is measured by enforcing a virtual machine to execute a benchmarking script or benchmarking program code. This script or program code may in particular embodiments be transferred via an active measurement protocol such as TWAMP.

Some central terms will be used within the present description, and to clarify the intended meaning of these terms, a set of selected terms will first be defined and explained.

The use of "the cloud" or of cloud computing relies on sharing of resources to achieve coherence and economies of scale. Cloud computing may be seen as a generalisation of converged infrastructure and shared services. The purpose of the cloud is to maximize the effectiveness of the shared resources. As schematically illustrated in FIG. 1, a number of users 10 or clients utilize or communicate with a cloud 20. As mentioned in the background section, the cloud model can be divided into four layers; the hardware layer 30, the infrastructure layer 40, the platform layer 50 or virtualization layer and the application layer 60. Each higher layer builds on top of the features and services provided by the lower layers.

A compute infrastructure provides processing, storage, networks, and other fundamental computing resources to the consumer, user or client. In a cloud view, the compute infrastructure interconnected with a network is mainly provided by the infrastructure layer 40.

A physical machine is in the present context a computer architecture and functions of a real world computer.

Figure 9:
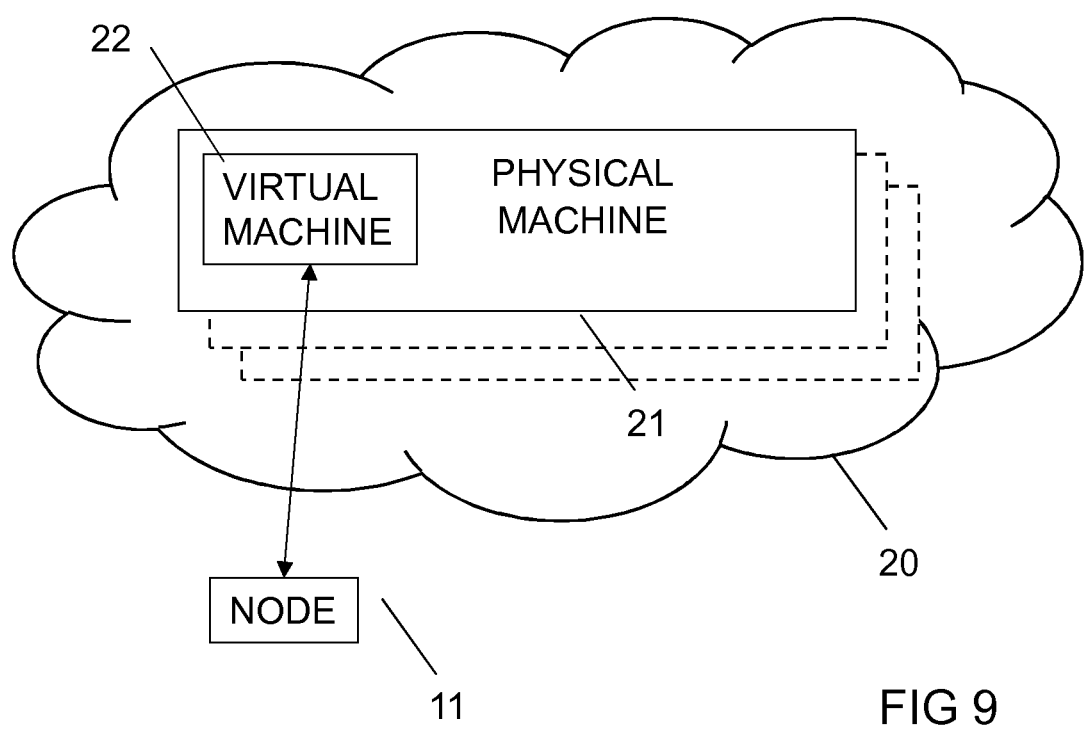
FIG. 9 is a schematic illustration of an embodiment of a virtual machine.

A virtual machine (VM) is an emulation of a machine, abstract or real, that is usually different from the host machine on which the VM is being emulated. Virtual machines may be based on specifications of a hypothetical computer or emulate the computer architecture and functions of a real world computer. FIG. 9 illustrates schematically a VM 22 being emulated by one or several physical machines 21, being available in the cloud 20. A node 11 of a user interacts with the virtual machine as if it would have been a physical machine.

A container is a form of operating system virtualization that is more efficient but less standardized than typical hardware virtualization. It provides the necessary computing resources to run an application almost as isolated as a virtual machine. However, the containers and applications must share the same underlying operating system.

An entity in a general meaning is the existence of something as contrasted by its attributes or properties. In the world of computing and communication, an entity is typically defined by a typical task or function that it is intended to perform. The entity may consist of one single unit or a part of one single unit, but in other embodiment it may also comprise several units or part of units. The aggregate or arrangement of such units or part units are together defined by the intended function of the entity. The entity may be real or virtual. The entity may be a machine, a part of a machine or an aggregate of machines or parts of machines, optionally including other devices or functions.

Benchmarking is used in the world of computers as a way of assessing performance by running a computer program on the device intended to be assessed. A benchmark message is in the present disclosure analogously used as denoting one or more packets of data and/or program code causing a benchmarking process to be performed. In particular embodiments, one type of messages are transported as IP packets.

Figure 2:
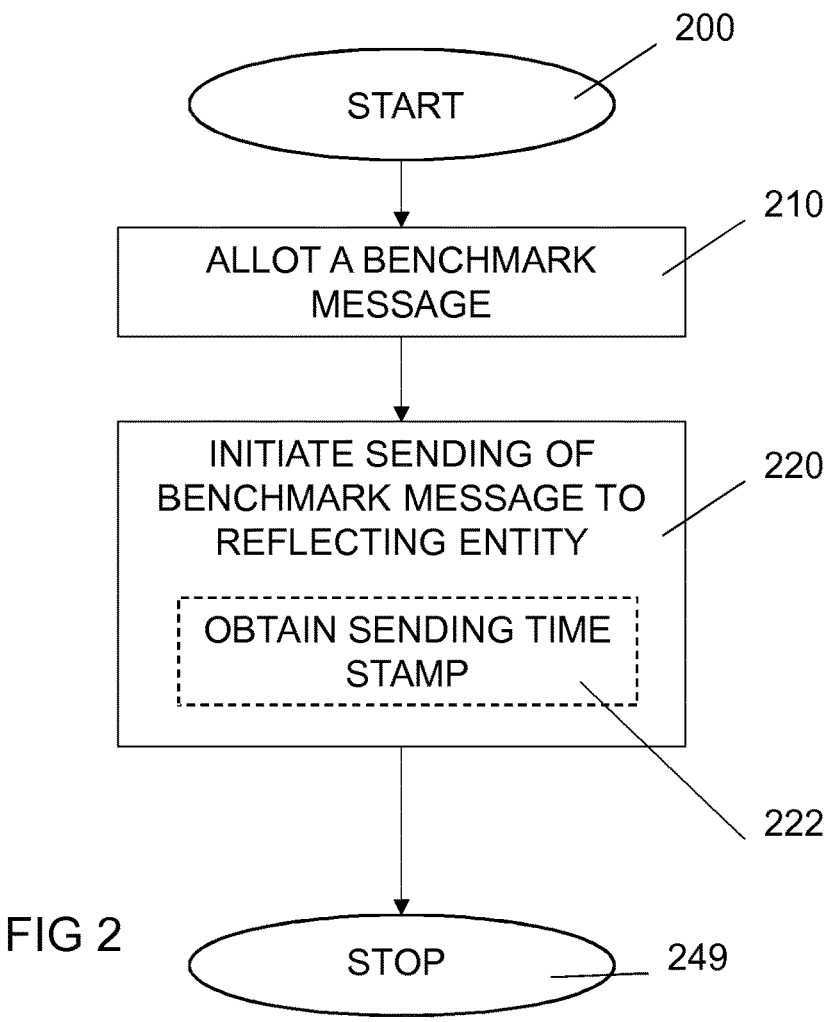
FIG. 2 is a flow diagram of steps of an embodiment of a method for resource monitoring of a compute infrastructure interconnected with a network.

In FIG. 2, a flow diagram of steps of an embodiment of a method for resource monitoring of a compute infrastructure interconnected with a network is illustrated. The compute infrastructure may comprise at least one of a virtual infrastructure and a real infrastructure. The procedure starts in step 200. In step 210, a benchmark message is allotted. The benchmark message comprises program code, or references to program code, to be executed on a reflecting entity intended to be monitored. The reflecting entity is able to execute program code. The program code of the allotted benchmark message requests capabilities of the reflecting entity when being executed. The allotting of the benchmark message is typically made to match the capabilities to capabilities that are of importance for a possible subsequent use of the reflecting entity, i.e. properties of the reflecting entity to be monitored. In step 220, a sending of the benchmark message to the reflecting entity is initiated. The procedure ends in step 249. The step 220 may, as further discussed below, in particular embodiments comprise a step 222 in which a sending time stamp of the sending of the benchmark message to the reflecting entity is obtained.

The actual sending of the benchmark message can in particular embodiments be performed by the same entity as is performing the steps 210 and 220 described above. The step 220 is then followed by a step of actually sending the benchmark message to the reflecting entity. However, in other embodiments, the actual sending of the benchmark message can be performed by a separate entity. The step 220 then becomes a pure initiation of a process that is actually performed in another entity.

In a particular embodiment, the reflecting entity is a virtual entity, in further particular embodiments a virtual machine or a virtual container.

In another particular embodiment, the reflecting entity is a physical entity, in further particular embodiments a physical machine.

The capabilities of the reflecting entity may in one embodiment be selected from processing, memory, communication, input/output, and storage. The capability to be selected to be monitored should preferably be selected so that they match to the nature of the intended possible final utilization. If the monitoring is made for planning for an activity that requires intense external communication, I/O capabilities are typically of crucial importance and the capabilities requested by the benchmark message program code should therefore preferably mainly involve I/O capabilities. Such activities could in an application comprising a communication network involve different types of user plane, storage or inter-VM communication tasks. If, on the other hand, the monitoring is made for scheduling functions that are involving complex calculation jobs, the I/O performance will not have a dominant impact on total performance and the capabilities requested by the benchmark message program code should therefore preferably mainly involve CPU performance and availability.

Figure 3:
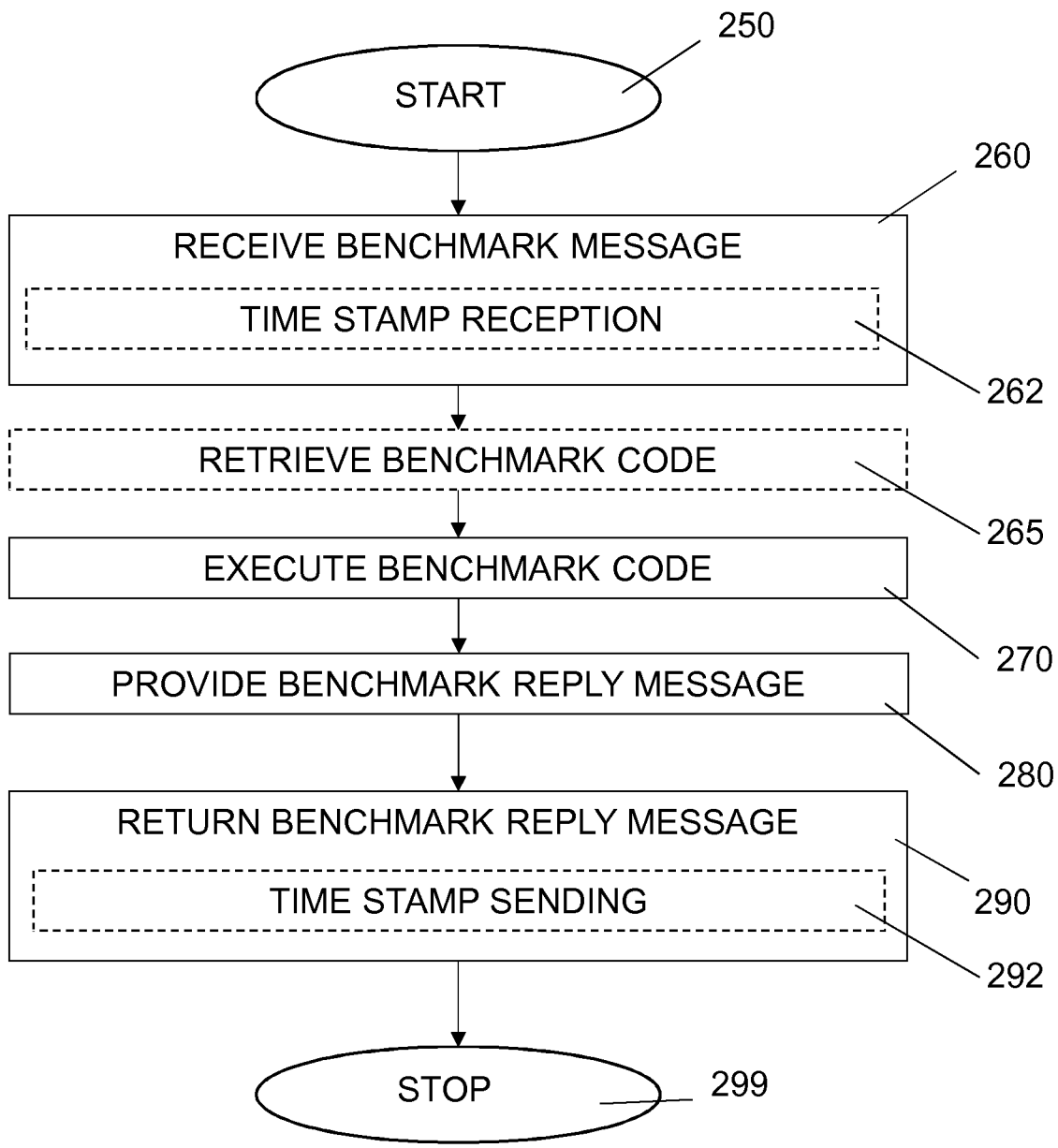
FIG. 3 is a flow diagram of steps of an embodiment of a method for assisting in resource monitoring of a compute infrastructure interconnected with a network.

In FIG. 3, a flow diagram of steps of an embodiment of a method for assisting in resource monitoring of a compute infrastructure interconnected with a network is illustrated. The compute infrastructure may comprise at least one of a virtual infrastructure and a real infrastructure. The procedure starts in step 250. In step 260, performed in a reflecting entity being able to execute program code, a benchmark message is received. The benchmark message comprises program code or references to program code. The program code of the benchmark message requests capabilities of the reflecting entity when being executed.

In one embodiment, where the actual program code is included in the benchmark message, the program code is extracted and in step 270, the program code of the benchmark message is executed by the reflecting entity. The program code of the benchmark message is preferably executed at a certain priority level to be monitored. In one particular embodiment, the priority level could correspond to Linux Nice levels 0-20. Other priority levels may be connected to whether the code should execute on a dedicated hardware CPU core or whether it should be executed on a shared core.

In another embodiment, where the benchmark message only comprises a reference to program code, the benchmark program code is retrieved, in step 265, based on the references to the program code. Then, in step 270, the program code of the benchmark message is executed by the reflecting entity.

In step 280, a benchmark reply message is provided. The benchmark reply message comprises execution time and optionally execution result of the execution of the program code. The execution result may also comprise other measurement results like storage read and write, availability, throughput, latency and error. In step 290, the benchmark reply message is returned, typically to the entity sending the original benchmark message. The procedure ends in step 299.

In a particular embodiment, the reflecting entity is a virtual entity, in further particular embodiments a virtual machine or a virtual container.

In another particular embodiment, the reflecting entity is a physical entity, in further particular embodiments a physical machine.

The capabilities of the reflecting entity may in one embodiment be selected from processing, memory, communication, input/output, and storage.

The step 260 may, as further discussed below, in particular embodiments comprise a step 262 in which time stamping of a reception of the benchmark message is performed. Likewise, the step 290 may, as further discussed below, comprise a step 292 in which time stamping a sending of the benchmark reply message is performed.

In a particular embodiment, the benchmark message program code comprises additional program code that additionally operates to request information about the reflecting entity that is not directly connected to the capabilities requested for running the benchmark program code. As non-limiting examples, this additional program code may ask for the total number of present users of the reflecting entity, the number of presently available VM's, the number of hard disks and/or what type of CPU the reflecting entity is based on etc.

The step 280 comprises in such embodiments compilation of such requested additional information to be included in the benchmark reply message.

In a particular embodiment, the step 280 may also comprise inclusion of system state information or other resources regarding the reflecting entity into the benchmark reply message. These other resources or system state information can e.g. be battery level, temperature, fan speed, number of open files etc. Such information can optionally be monitored both before and after the program code is run, to enable to determine if the program code execution influences such system states.

When the benchmark reply message has been returned to the entity that sent the original benchmark message, the content can be analysed, giving information about the capabilities that was intended to be monitored. The analysis of the content of the benchmark reply message can in particular embodiments be utilized for initiating scheduling of utilization of the compute infrastructure. In other particular embodiments, the analysis can be used for statistical analysis of the robustness of the compute infrastructure. Such statistical analysis may enable improvements against e.g. intentional or unintentional overload situations.

Figure 4:
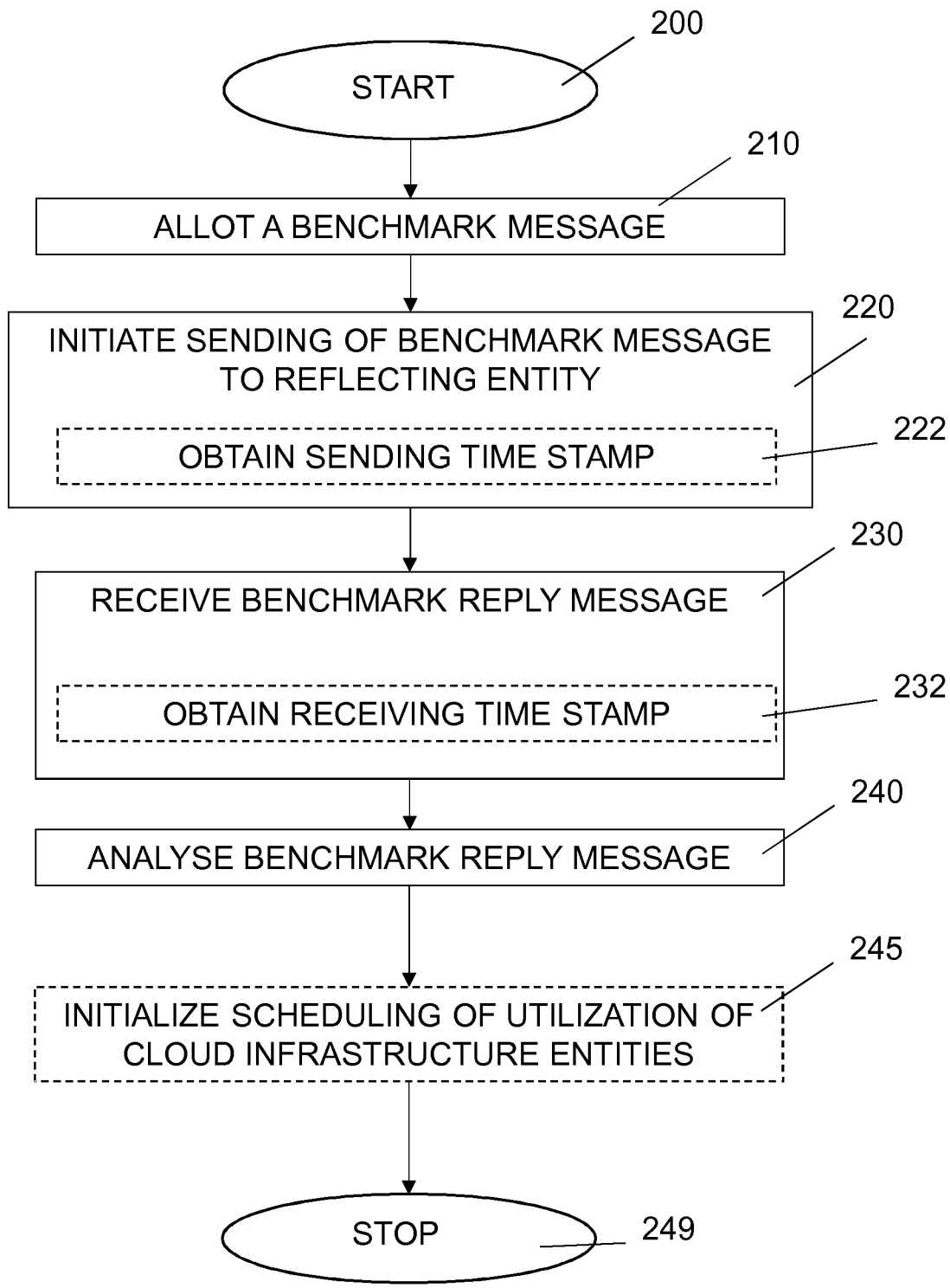
FIG. 4 is a flow diagram of steps of another embodiment of a method for resource monitoring of a compute infrastructure interconnected with a network.

The analysis can be performed in any entity being in communicational contact with the entity receiving the benchmark reply message. In one embodiment, the analysis may be performed by the same entity as was allotting the original benchmark message. FIG. 4 illustrates a flow diagram of steps of an embodiment of a method for resource monitoring of a compute infrastructure interconnected with a network is illustrated. Steps 210 and 220 corresponds to the same steps as described in connection with FIG. 2. In step 230, a benchmark reply message is received. The benchmark reply message is created by the reflecting entity and comprises execution time and optionally execution result of an execution of the program code in the reflecting entity. In a particular embodiment, the benchmark reply message is created as illustrated in FIG. 3. In step 240, the benchmark reply message is analysed, giving information about the capabilities of the reflecting entity.

In a particular embodiment, and as briefly discussed above, the step 220 of initiating a sending of the benchmark message to the reflecting entity is initiated comprises a step 222 in which a sending time stamp of the sending of the benchmark message to the reflecting entity is obtained. This opens up for a monitoring of the communication resources as well. With reference to FIG. 3, the step 260 comprises in this particular embodiment a step 262 in which time stamping of a reception of the benchmark message is performed. The communication time of the benchmark message can thus be available as the time differences between the time stamp of the sending of the benchmark message and the time stamp of the reception of the benchmark message. The time stamp of the reception of the benchmark message also opens up for monitoring of the timing aspects of the use of the capabilities of the reflecting entity that are to be utilized by the program code of the benchmark message. The step 290 likewise comprises a step 292 in which time stamping a sending of the benchmark reply message is performed. The execution time of the program code of the benchmark message, including buffering, code retrieval etc. can thus be available as or at least estimated by the time differences between the time stamp of the reception of the benchmark message and the time stamp of the sending of the benchmark reply message. The time stamp of the sending of the benchmark reply message also opens up for monitoring of the communication timing of the benchmark reply message.

In an alternative embodiments, a separate time can be used for monitoring the actual execution of the benchmarking test according to the program code. In such an embodiment, the timer is started or set at the start of the execution and stooped when the execution is finished. The timer result is then preferably embedded into the benchmarking reply message.

Returning to FIG. 4, the step 230 comprises a part step 232, in which a receiving time stamp of the benchmark reply message is obtained. The communication time of the benchmark reply message can thus be available as the time differences between the time stamp of the sending of the benchmark reply message and the time stamp of the reception of the benchmark reply message. The possible access to timing information about the actual communication may also be of importance for the analysis of the outcome of the active measurement provided by the benchmark message. Thus in a further particular embodiment, where the benchmark reply message further comprises a time stamp for reception of the benchmark message in the reflecting entity and a time stamp for sending of the benchmark reply message, the step of analysing the benchmark reply message comprises analysing of timing characteristics of communication with the reflecting entity.

The basic concept of the presented technology is to inject test packets from a sender, which is interested in the capabilities of a virtual container, virtual machine or a physical machine or the like, towards a receiver. The packet contains benchmarking code which is supposed to be evaluated by the receiver side.

Figure 5:
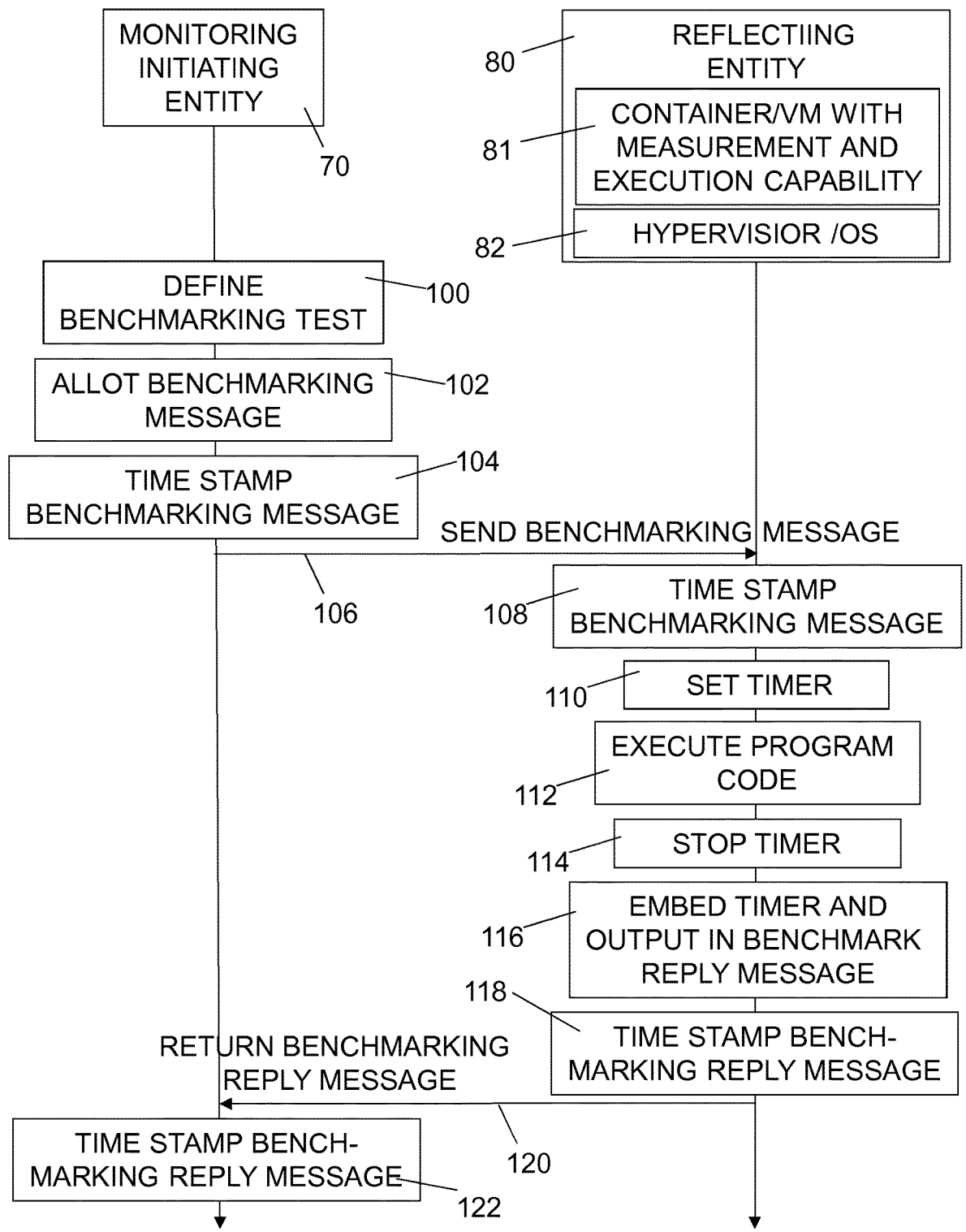
FIG. 5 is an embodiment of a signalling scheme of a process of actively measuring network and VM performance.

An embodiment of a process of actively measuring a network and VM performance is illustrated in FIG. 5. In this particular embodiment, a monitoring initiating entity 70 is also responsible for the actual sending and receiving of the benchmarking message. The monitoring initiating entity 70 defines 100 which benchmarking test to be performed. A benchmarking message is allotted 102, which typically comprise creation of measurement message with or without program code. The benchmarking message is time stamped 104 and the benchmarking message is sent 106 from the monitoring initiating entity 70 to a reflecting entity 80 to be monitored. In this embodiment, the reflecting entity 80 comprises a container or VM 81 with measurement and execution capability and a hypervisor/OS 82.

When the packet or packets arrive at the receiver side, i.e. at the reflecting entity 80 the benchmarking message is time stamped 108. The content, the program code or references thereto, is extracted and the program code is executed 112 along with the instructions embedded in the packet(s) and also according to policies for execution residing on the receiver side.

A timer is started 110 before executing 112 the program code. After the program code has been executed the timer is stopped 114.

A new message, the benchmarking reply message, is created as a response to the received packet(s). This message comprises in this embodiment information about the execution time as well as output from the program code embedded in the benchmarking reply message. The benchmarking reply message is time stamped 118, and the reflecting entity 80 returns 120 the benchmarking reply message to the sender.

The sender, in this embodiment the monitoring initiating entity 70, receives the benchmarking reply message comprising execution time and output and the benchmarking reply message is time stamped 122.

It should also be noted that in the present embodiment, the message sending process is associated with a time stamping process, e.g. along the lines of TWAMP, in order to also measure network characteristics such as delay and waiting time for the code to be executed and other parameters. This allows for understanding the impact on delay from the network and from the execution.

By making the benchmarking message sending routines as compatible as possible with e.g. TWAMP definitions, it will furthermore be possible to create a compute test with a connectivity test performed according to TWAMP. In other words, the TWAMP connectivity test could be modified to carry a compute test and return its results. The TWAMP session could communicate the request for a compute test and the TWAMP payload fill could even be used to carry the actual code, if not provided by other means. Similarly, the result of a compute test can be sent as the result in a TWAMP reply to the controller.

The benchmarking program code to be executed by the receiver container or VM or physical machine is either explicit, i.e. real code, or implicit, i.e. reference to a predefined template.

Explicit program code can for example be written in Java or other languages. The program code is intended to evaluate various resources on the host machine by running different tasks. The program code is intended to be run on a certain priority level. The program code aims at understanding the responsiveness of various resources. Some non-exclusive examples include:

run CPU intensive tasks by repeating execution of a user plane function with numerical calculations or an empty busy-wait loop.

run I/O intensive tasks by repeating execution of system calls such as sync( ).

run memory intensive tasks by executing a series of memory allocation system calls.

run hard drive intensive tasks by read and write to disk

In one embodiment, the benchmark message actually comprises the program code. The program code can then be extracted by the reflecting entity to be executed.

Figure 6:
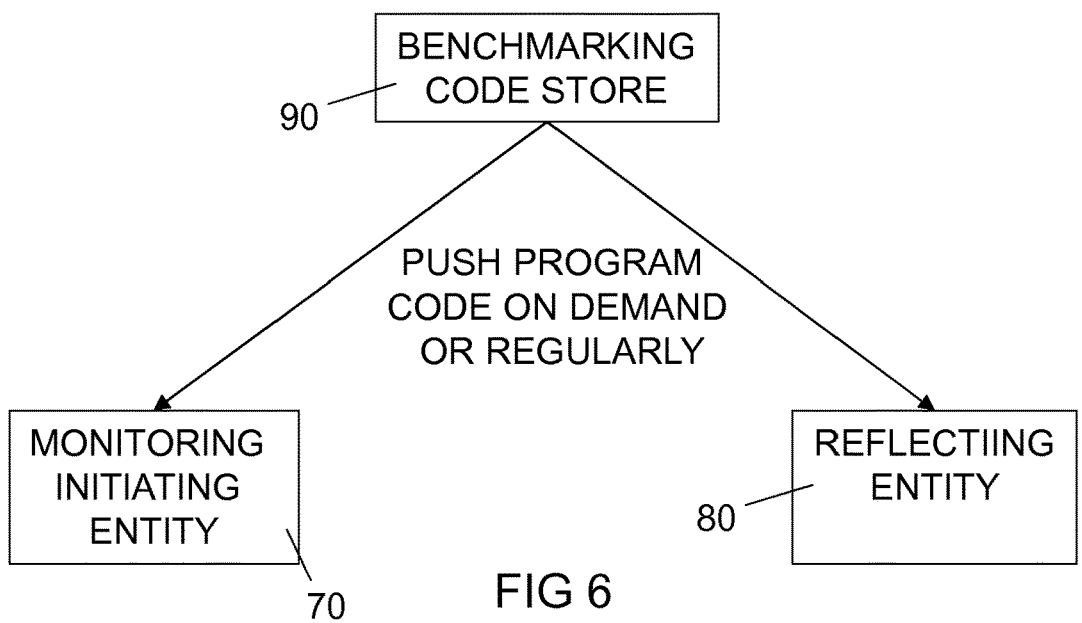
FIG. 6 is a schematic illustration of one embodiment for synchronization of benchmarking code between sender and host.

In another embodiment, the benchmark message only comprises references to the program code. As illustrated by the dotted box in FIG. 3, the method then may comprise the further step 265 of retrieving the program code from a storage according to the received program code reference. Preferably, the program code is available in a storage in, or in close communicational connection to, the monitoring initiating entity, as well as in a storage in, or in close communicational connection to, the reflecting entity. Such implicit program code would be predefined tasks agreed upon by the sender and receiver. This reduces the security risk of executing malicious program code. The implicit program code can be synchronized through a benchmarking code store. This is schematically illustrated in FIG. 6, where benchmarking program code is stored in a benchmarking code store 90. The program code is then pushed on demand or regularly to storages in the monitoring initiating entity 70 and the reflecting entity 80, respectively.

Other options for the program code are to execute a series of actions that increasingly stress the resources on the receiver side. When the stress becomes high enough to be noticed, by some means, it will stop and send back the results. In a particular embodiment, a stress test may utilize an increasing amount of the CPU over time until an impact on the services running on the machine is seen. Similar stress tests can be performed in other embodiments by generating I/O operations/memory read and write or similar actions and then see how far the test can proceed without violating the service performance.

In a particular embodiment, as illustrated by step 245 of FIG. 4, scheduling of utilization of the compute infrastructure entities is initiated in response to the information about the capabilities of the reflecting entity. Many different types of applications and scenario are feasible.

FIG. 7 illustrates an embodiment of a compute infrastructure 99 interconnected with a network, with a situation where a customer of a data centre offers a service which runs different pieces of software on several servers. Each server is run on a VM 22 in a physical host 23. In each VM 22 there is also a reflector of measurements according to the above presented ideas. The VM 22 therefore operates as a reflecting entity.

A load balancer node 24 gets a request 140 from a client 14 to run some software and selects 130 an appropriate server for each request. The servers are selected based on measurements, where a small test program code is run at the different servers. To that end, benchmarking packet(s) 106 are sent from the load balancer 24, here operating as a monitoring initiating entity, to the respective VMs 22. The result from each execution of the program code is returned 120 in a benchmark reply message 120 to the load balancer 24. The VM 22 which gives the best result is then selected to run the request. A response 142 thereto is sent to the client 14.

The reflecting entities can also be monitored during the service and from continuous analysis the different parts of the application may be moved or selected for further load balance.

FIG. 8 illustrates another scenario of a compute infrastructure 99 interconnected with a network. A cloud operator monitors, by a monitoring manager 25 the state of different nodes in a data centre, using a Monitoring Manager 25, which initiates measurement sessions at one or several Senders 26. The monitoring manager 25 thereby acts as a monitoring initiating entity. An order 150 initiating a measurements session is sent from the monitoring manager to the sender 26.

Each sender 26 can send one or several trigger packet(s), in form of benchmarking messages 106 according to the above description, to one or several reflecting entities, in this embodiment containers 27 in a physical host 23. Each trigger packet starts some program code to be executed in the respective container 27. When the program code has finished, the measurement output is sent back to the sender 26 in a benchmark reply message 120. The sender 26 may analyse or aggregate the information before sending the results 152 back to the Monitoring Manager 25, which do the final analysis of the data. Depending on the analysis results the operator can act on the infrastructure, e.g. move VMs, select hardware for new applications, send alarms etc.

The sender 26 here acts as a coordinator for benchmarking messages 106 and forwarding entity regarding information from the benchmark reply message 120.

FIGS. 7 and 8 are non-exclusive embodiments of compute infrastructures interconnected with a network. These compute infrastructures are configured for allotting, in a monitoring initiating entity, a benchmark message. The benchmark message comprises program code, or references to program code, to be executed on a reflecting entity that is able to execute program code. The reflecting entity is intended to be monitored. The program code of the allotted benchmark message requests capabilities of the reflecting entity when being executed. The compute infrastructure is further configured for sending the benchmark message to the reflecting entity, for receiving, in the reflecting entity, the benchmark message, and for executing, in the reflecting entity, the program code of the benchmark message. The compute infrastructure is further configured for providing, in the reflecting entity, a benchmark reply message comprising execution time and optionally execution result of the execution of the program code, and for returning the benchmark reply message from the reflecting entity.

In a typical embodiment, the receiver of a benchmarking message, i.e. the reflecting entity, is either an already executing container/VM in the host or a newly spawned container/VM specifically designed for executing benchmarking code. The receiver can also be a physical host running a traditional operating system on top of the physical hardware.

In an embodiment of a reflecting entity, for existing containers/VMs there is preferably an agreed port number for receiving of measurement packets, i.e. benchmarking messages. The actual execution of the benchmarking program code will typically be affected by the number of containers/VMs in the system as well as any other configuration parameters associated with the container/VM such as CPU affinity, memory constraints and hard drive limitations.

If spawning a new container/VM for measurements is preferred, then the new container/VM preferably should have the same configuration as a service container/VM would have in a deployment scenario.

Configuration parameters may comprise CPU, Max memory usage and/or network constraints.

Figure 10:
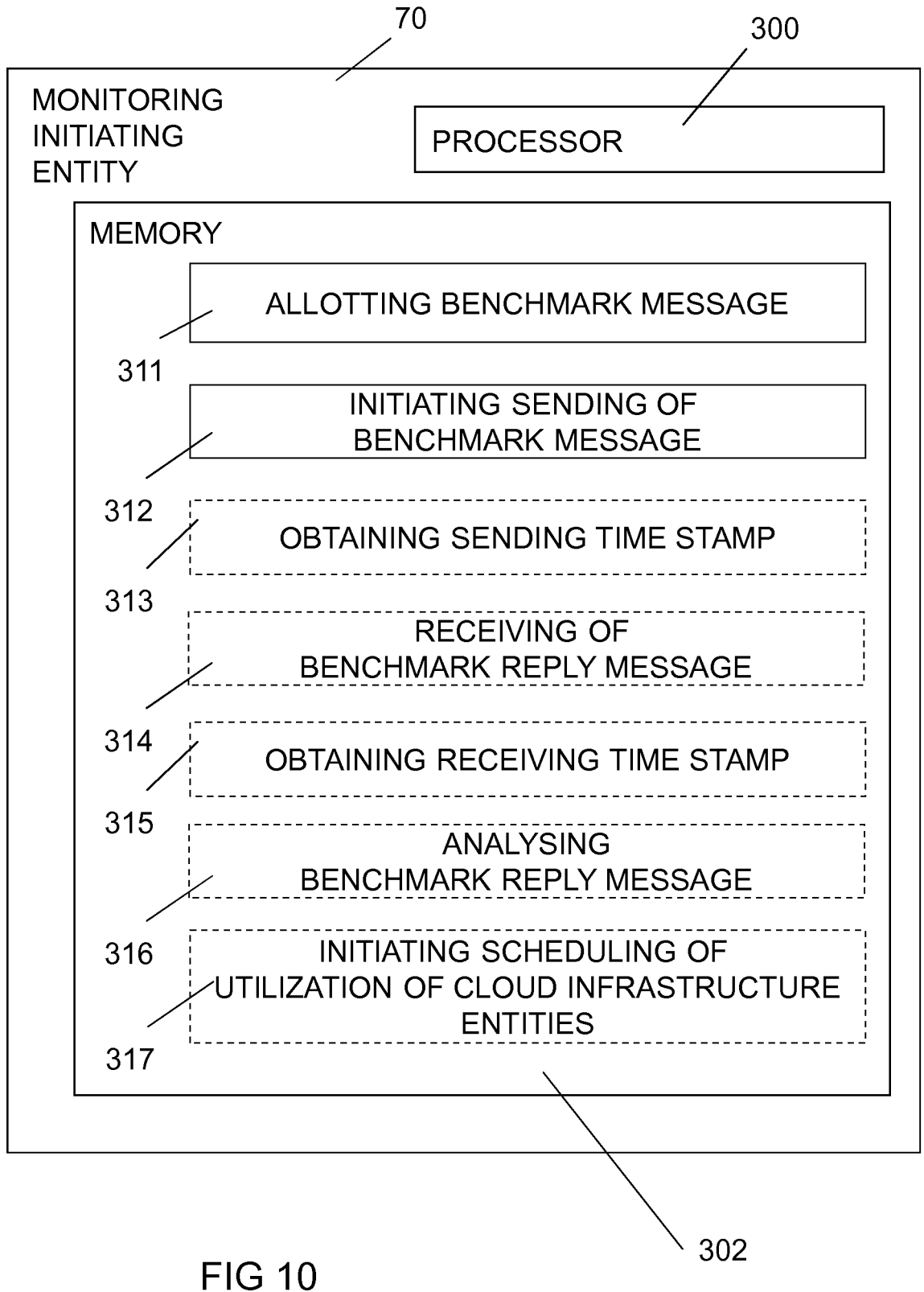
FIG. 10 is a schematic illustration of an embodiment of a monitoring initiating entity.

FIG. 10 illustrates schematically an embodiment of a monitoring initiating entity 70. The monitoring initiating entity is comprised in a compute infrastructure interconnected with a network. The monitoring initiating entity is configured for allotting a benchmark message. The benchmark message comprises program code, or references to program code, to be executed on a reflecting entity that is able to execute program code. The reflecting entity is the entity intended to be monitored. The program code of the allotted benchmark message requests capabilities of the reflecting entity when being executed. The monitoring initiating entity is further configured for initiating sending of the benchmark message to said reflecting entity.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In the particular example of FIG. 10, the apparatus comprises a processor 300 and a memory, said memory 302 comprising instructions executable by the processor, whereby the apparatus/processor is operative to allotting the benchmark message and initiating sending of the benchmarking message. In particular, the memory 302 comprises software for allotting the benchmark message 311 and software for initiating sending of a benchmarking message 312.

The computer programs are loaded into the memory for execution by processing circuitry including one or more processors. The processor(s) and memory are interconnected to each other to enable normal software execution. An input/output device is also interconnected to the processor(s) and/or the memory to enable input and/or output of relevant data.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, the reflecting entity is a virtual entity. In a further particular embodiment, the reflecting entity is a virtual machine or a virtual container.

In another particular embodiment, the reflecting entity is a physical entity. In a further particular embodiment, the reflecting entity is a physical machine.

In a particular embodiment, the capabilities are selected from processing, memory, communication, input/output, and storage.

In a particular embodiment, the monitoring initiating entity is further configured for obtaining a sending time stamp of the sending of the benchmark message to the reflecting entity, as illustrated by the software component 313.

In a particular embodiment, the monitoring initiating entity is further configured for receiving a benchmark reply message, as illustrated by the software component 314. The benchmark reply message is thereby created by the reflecting entity and comprises execution time and optionally execution result of an execution of the program code in the reflecting entity. The monitoring initiating entity is further configured for analysing said benchmark reply message, giving information about the capabilities, as illustrated by the software component 316.

In a particular embodiment, the monitoring initiating entity is further configured for initiating scheduling of utilization of cloud infrastructure entities in response to the information about said capabilities, as illustrated by the software component 317.

In a particular embodiment, the monitoring initiating entity is further configured for obtaining a receiving time stamp of the benchmark reply message, as illustrated by the software component 315. In a further particular embodiment, where the benchmark reply message further comprises a time stamp for reception of the benchmark message in the reflecting entity and a time stamp for sending of the benchmark reply message, the arrangement is further configured for performing the analysing of the benchmark reply message by comprising analysing of timing characteristics of communication with the reflecting entity.

Figure 11:
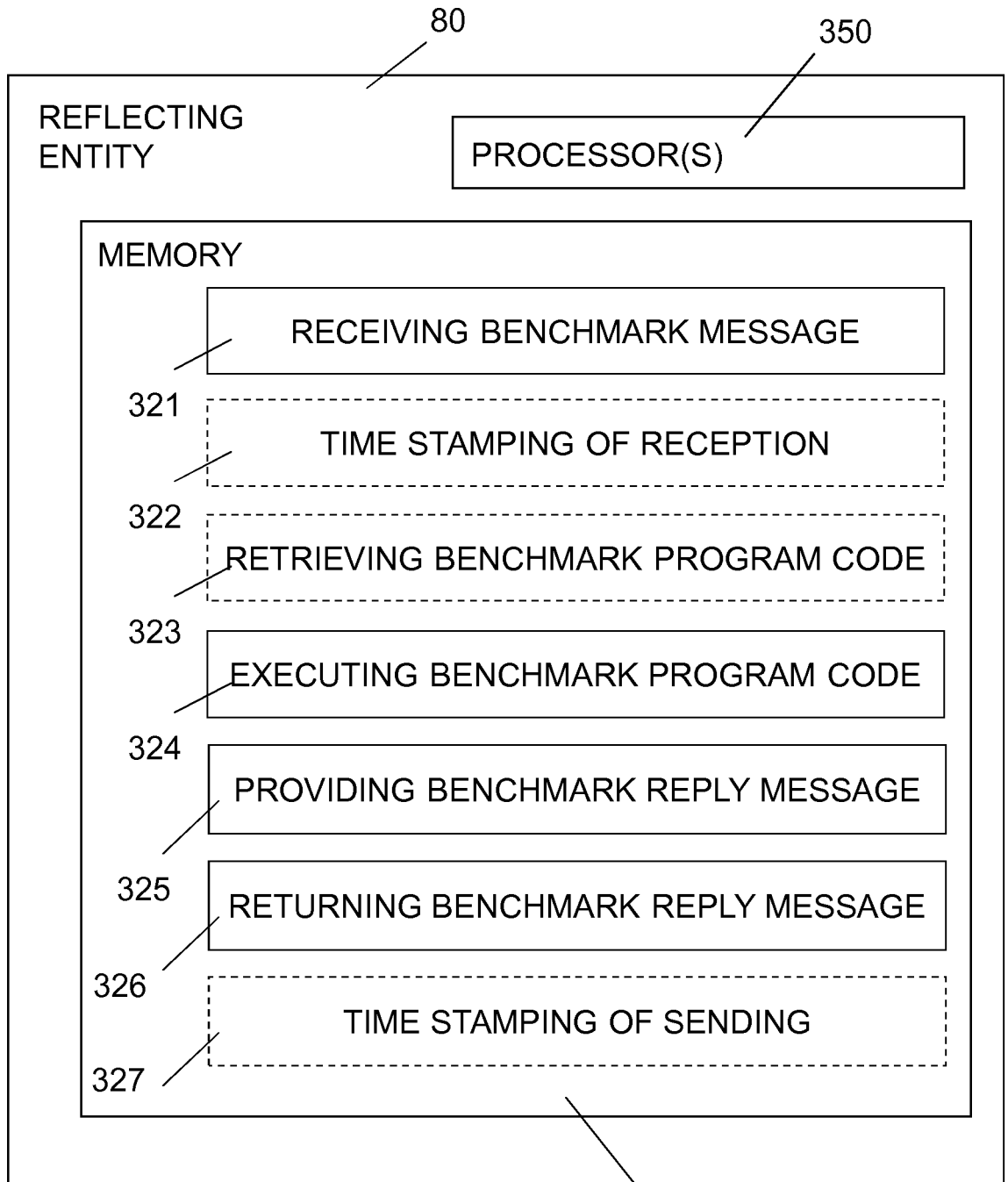
FIG. 11 is a schematic illustration of an embodiment of a reflecting entity.

FIG. 11 illustrates schematically an embodiment of a reflecting entity 80. The reflecting entity 80 is configured for receiving a benchmark message. The benchmark message comprises program code or references to program code. The program code of the benchmark message requests capabilities of the reflecting entity when being executed. The reflecting entity 80 is further configured for executing the program code of the benchmark message, for providing a benchmark reply message comprising execution time and optionally execution result of the execution of the program code, and for returning the benchmark reply message.

In the particular example of FIG. 11, the reflecting entity 80 comprises a processor 350 and a memory, said memory 352 comprising instructions executable by the processor, whereby the apparatus/processor is operative to receive benchmark messages, to execute the benchmark program code, to provide a benchmark reply message and to return the benchmark reply message. In particular, the memory 352 comprises a software component for receiving a benchmark message 321, a software component for executing the benchmark program code 324, a software component for providing a benchmark reply message 325 and a software component for returning the benchmark reply message 326.

In a particular embodiment, the reflecting entity 80 is a virtual entity. In a further particular embodiment, the reflecting entity 80 is a virtual machine or a virtual container.

In a particular embodiment, the reflecting entity 80 is a physical entity. In a further particular embodiment, the reflecting entity 80 is a physical machine.

In a particular embodiment, the capabilities are selected from processing, memory, communication, input/output, and storage.

In a particular embodiment, the benchmark message comprises references to the program code, whereby the reflecting entity is further configured for retrieving the program code from a storage according to the program code reference, as illustrated by the software component 323.

In a particular embodiment, the reflecting entity is further configured for time stamping a reception of the benchmark message, as illustrated by the software component 322 and for time stamping a sending of the benchmark reply message, as illustrated by the software component 327.

The functionality involving sending and receiving of packets with benchmarking program code or references thereto can be standardized as an optional feature of active measurement protocols such as TWAMP and OWAMP for IP networks. Other, more specialized protocols can also be developed.

In a particular embodiment, a computer program comprises instructions, which when executed by at least one processor, cause the processor(s) to allot a benchmark message. The benchmark message comprises program code, or references to program code, to be executed on a reflecting entity that is able to execute program code. The reflecting entity is the entity intended to be monitored. The program code of the allotted benchmark message requests capabilities of the reflecting entity when being executed. The computer program comprises further instructions, which when executed by the processor(s), cause the processor(s) to initiate sending of the benchmark message to the reflecting entity.

In another particular embodiment, a computer program comprises instructions, which when executed by at least one processor, cause the processor(s) to receive a benchmark message. The benchmark message comprises program code or references to program code. The program code of the benchmark message requests capabilities when being executed. The computer program comprises further instructions, which when executed by the processor(s), cause the processor(s) to execute the program code of the benchmark message, to provide a benchmark reply message comprising execution time and optionally execution result of the execution of the program code, and to return the benchmark reply message.

The proposed technology also provides a carrier comprising any of the computer programs described here above, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A corresponding entity may be defined as a group of function modules, where each step performed by the processor corresponds to a function module. In this case, the function modules are implemented as a computer program running on the processor. Hence, the entity may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. Examples of such function modules are illustrated in FIGS. 12 and 13.

Figure 12:
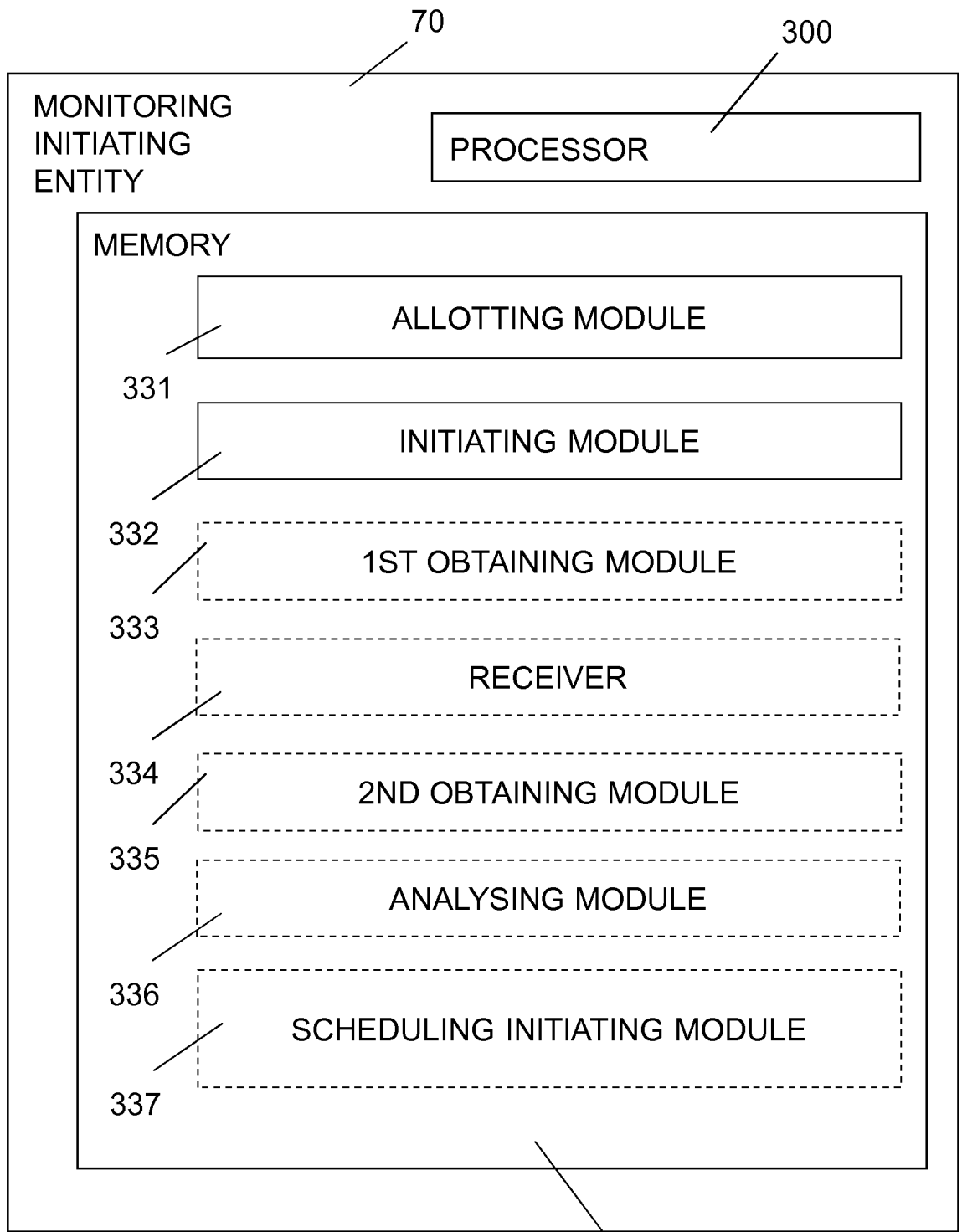
FIG. 12 is a schematic illustration of an embodiment of arrangement in a compute infrastructure interconnected with a network.
Figure 13:
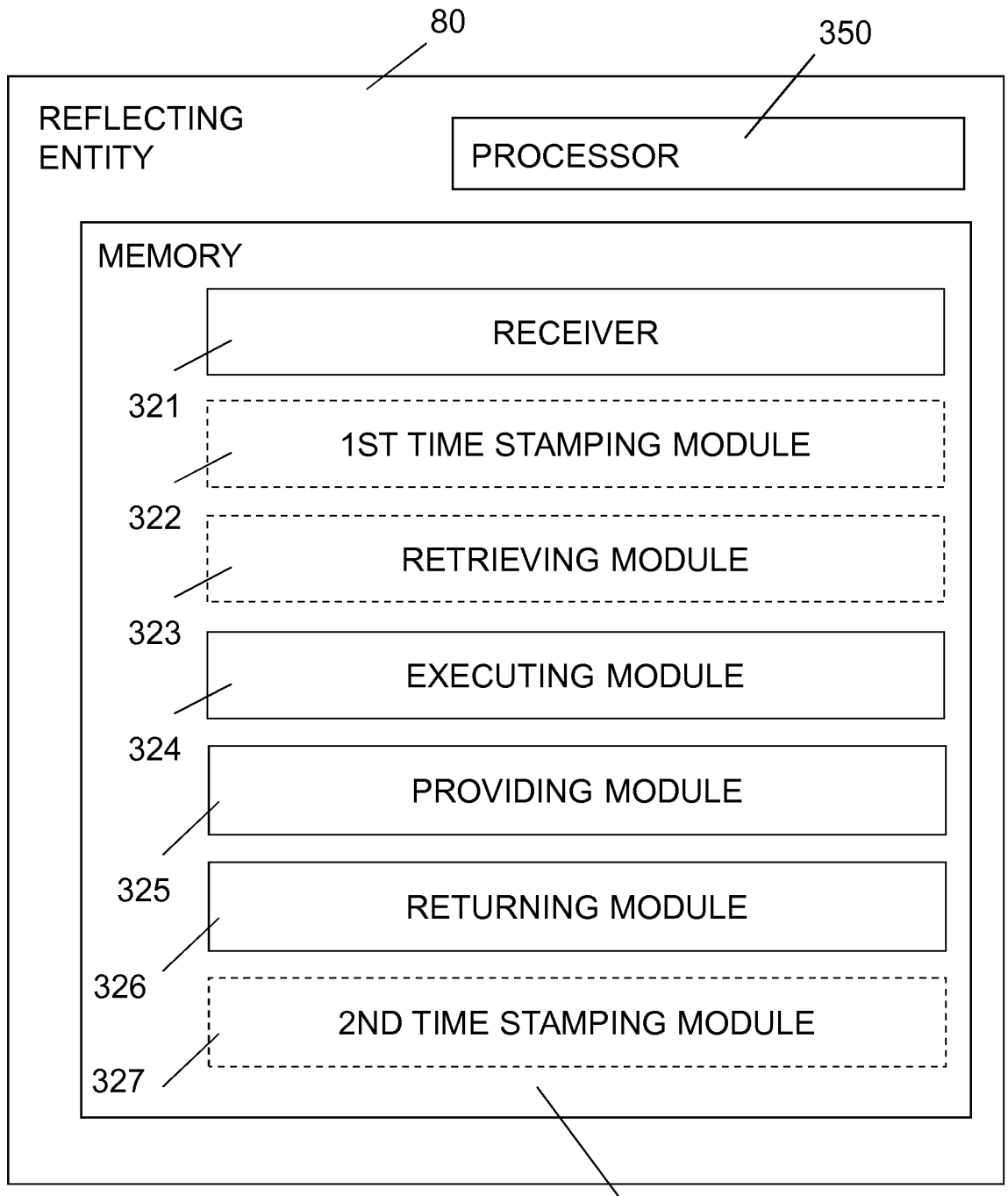
FIG. 13 is a schematic illustration of an embodiment of a reflecting arrangement in a compute infrastructure interconnected with a network.

FIG. 12 is a schematic block diagram illustrating an example of an arrangement in a compute infrastructure interconnected with a network, in this particular embodiment a monitoring initiating entity comprising a group of function modules. The arrangement comprises an allotting module 331 for allotting a benchmark message. The benchmark message comprises program code, or references to program code, to be executed on a reflecting entity that is able to execute program code. The reflecting entity is the entity intended to be monitored. The program code of the allotted benchmark message requests capabilities of the reflecting entity when being executed. The arrangement further comprises an initiating module 332 for initiating sending of the benchmark message to the reflecting entity.

In particular embodiments, the arrangement further comprises a first obtaining module 333, for obtaining a sending time stamp of the sending of the benchmark message to the reflecting entity.

In particular embodiments, the arrangement further comprises a receiver 334, for receiving a benchmark reply message and an analysing module 336 for analysing the benchmark reply message, giving information about the capabilities. In a further particular embodiment, the arrangement further comprises a scheduling initiating module for initiating scheduling of utilization of the compute infrastructure entities in response to the information about the capabilities.

In particular embodiments, the arrangement further comprises a second obtaining module 335, for obtaining a receiving time stamp of the benchmark reply message.

FIG. 13 is a schematic block diagram illustrating an example of a reflecting arrangement in a compute infrastructure interconnected with a network, in the present embodiment a reflecting entity, comprising a group of function modules. The reflecting arrangement comprises a receiver 321 for receiving a benchmark message. The benchmark message comprises program code or references to program code. The program code of the benchmark message requests capabilities when being executed. The reflecting arrangement further comprises an executing module 324 for executing the program code of the benchmark message. The reflecting arrangement further comprises a providing module 325 for providing a benchmark reply message comprising execution time and optionally execution result of the execution of the program code. The reflecting arrangement further comprises a returning module 326 for returning the benchmark reply message.

In particular embodiments, the arrangement further comprises a retrieving module 323, for retrieving the program code from a storage according to the program code reference.

In particular embodiments, the arrangement further comprises a first time stamping module 322, for time stamping a reception of the benchmark message and a second time stamping module 327, for time stamping a sending of the benchmark reply message.

Alternatively it is possibly to realize the modules in FIGS. 12 and/or 13 predominantly by hardware modules, or alternatively by hardware. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

Abbreviations

ASIC Application Specific Integrated Circuit
CAPEX capital expenditures
CD Compact Disc
CPU Central Processing Unit
DSP Digital Signal Processor
DVD Digital Versatile Disc
FPGA Field Programmable Gate Array
GPU Graphics Processing Unit
HDD Hard Disk Drive
IaaS Infrastructure as a Service
ICMP Internet Control Message Protocol
IETF Internet Engineering Task Force
IMS Internet protocol Multimedia System
I/O Input/Output
IP Internet Protocol
IPPM Internet Protocol Performance Metrics
KPI Key Performance Indicator
MEP Measurement End Point
MIP Measurement Intermediate Point
NFV network function virtualization
OPEX operating expenditures
OWAMP One-Way Active Measurement Protocol PaaS Platform as a Service
PLC Programmable Logic Controller
RAM Random Access Memory
ROM Read-Only Memory
SaaS Software as a Service
SLA Service Level Agreement
TCE Transport Control Protocol
TCP Transmission Control Protocol
TWAMP Two-Way Active Measurement Protocol
UDP User Datagram Protocol
USB Universal Serial Bus
VM Virtual Machine
VPN Virtual Private Network

The invention claimed is:

1. A method for resource monitoring of a compute infrastructure interconnected with a network, said method comprising:
allotting a benchmark message;
said benchmark message comprising program code, or references to the program code, to be executed on a reflecting entity being able to execute the program code, said reflecting entity being intended to be monitored;
said program code of said allotted benchmark message requesting capabilities of said reflecting entity when being executed, wherein said requested capabilities match capabilities that are of importance for a subsequent use of said reflecting entity; and
initiating sending of said benchmark message to said reflecting entity.

2. The method according to claim 1, wherein said reflecting entity is a virtual entity.

3. The method according to claim 2, wherein said reflecting entity is a virtual machine or a virtual container.

4. The method according to claim 1, wherein said reflecting entity is a physical entity.

5. The method according to claim 4, wherein said reflecting entity is a physical machine.

6. The method according to claim 1, wherein said capabilities are selected from at least one of: processing, memory, communication, input/output, and storage.

7. The method according to claim 1, further comprising:
obtaining a sending time stamp of said sending of said benchmark message to said reflecting entity; and
obtaining a receiving time stamp of a benchmark reply message.

8. The method according to claim 1, further comprising:
receiving a benchmark reply message;
said benchmark reply message being created by said reflecting entity and comprising execution time and execution result of an execution of said program code of said allotted benchmark message in said reflecting entity; and
analysing said benchmark reply message, giving information about said capabilities.

9. The method according to claim 8, further comprising:
initiating scheduling of utilization of compute infrastructure entities in response to said information about said capabilities.

10. The method according to claim 9, wherein said benchmark reply message further comprises a time stamp for reception of said benchmark reply message in said reflecting entity and a time stamp for sending of said benchmark reply message, and wherein said analysing said benchmark reply message comprises analysing of timing characteristics of communication with said reflecting entity.

11. A method for assisting in resource monitoring of a compute infrastructure interconnected with a network, said method comprising:
receiving, in a reflecting entity being able to execute program code, of a benchmark message;
said benchmark message comprising the program code or references to the program code;
said program code of said benchmark message requesting capabilities of said reflecting entity when being executed, wherein said requested capabilities match capabilities that are of importance for a subsequent use of said reflecting entity;
executing said program code of said benchmark message;
providing a benchmark reply message comprising execution time and optionally execution result of said execution of said program code; and
returning said benchmark reply message.

12. The method according to claim 11, wherein said reflecting entity is a virtual entity.

13. The method according to claim 12, wherein said reflecting entity is a virtual machine or a virtual container.

14. The method according to claim 11, wherein said reflecting entity is a physical entity.

15. The method according to claim 14, wherein said reflecting entity is a physical machine.

16. The method according to claim 11, wherein said capabilities are selected from at least one of: processing, memory, communication, input/output, and storage.

17. The method according to claim 11, wherein said benchmark message comprises said references to said program code, said method further comprising:
retrieving said program code from a storage according to said program code reference.

18. The method according to claim 11, further comprising:
time stamping said reception of said benchmark message; and
time stamping a sending of said benchmark reply message.

19. A monitoring initiating entity in a compute infrastructure interconnected with a network, said monitoring initiating entity comprising:
a processor; and
a memory, the memory containing instructions executable by the processor, in which the instructions, when executed by the processor, cause the monitoring initiating entity to perform operations to:
allot a benchmark message;
said benchmark message comprises program code, or references to the program code, to be executed on a reflecting entity being able to execute the program code, said reflecting entity being intended to be monitored;
said program code of said allotted benchmark message requesting capabilities of said reflecting entity when being executed, wherein said requested capabilities match capabilities that are of importance for a subsequent use of said reflecting entity; and
initiate sending of said benchmark message to said reflecting entity.

20. A reflecting entity in a compute infrastructure interconnected with a network, said reflecting entity being able to execute program code, and said reflecting entity comprising:
a processor; and a memory, the memory containing instructions executable by the processor, in which the instructions, when executed by the processor, cause the reflecting entity to perform operations to:
receive a benchmark message;
said benchmark message comprising the program code or references to the program code;
said program code of said benchmark message requesting capabilities of said reflecting entity when being executed, wherein said requested capabilities match capabilities that are of importance for a subsequent use of said reflecting entity;
execute said program code of said benchmark message;
provide a benchmark reply message comprising execution time and optionally execution result of said execution of said program code; and
return said benchmark reply message.

21. The method according to claim 1, wherein said benchmark message triggers execution start of said program code of said allotted benchmark message upon receipt in said reflecting entity.

22. The method according to claim 1, wherein said benchmark message is a probe packet based on an active measurement protocol, and said program code of said allotted benchmark message, or said references to said program code, is embedded in a payload of the probe packet, and wherein a benchmark reply message is a probe packet.

23. The method according to claim 22, wherein said active measurement protocol is Two-Way Active Measurement Protocol (TWAMP), Internet Control Message Protocol (ICMP), or Cisco Service Level Agreement (SLA) benchmark message triggering execution start of said program code of said allotted benchmark message upon receipt in said reflecting entity.

* * * * *